US008438652B2

(12) United States Patent
Weinstein et al.

(10) Patent No.: US 8,438,652 B2
(45) Date of Patent: May 7, 2013

(54) RESTRICTED ERASE AND UNLOCK OF DATA STORAGE DEVICES

(75) Inventors: Robert E. Weinstein, Berthoud, CO (US); Monty A. Forehand, Loveland, CO (US)

(73) Assignee: Seagate Technology LLC, Cupertino, CA (US)

( * ) Notice: Subject to any disclaimer, the term of this patent is extended or adjusted under 35 U.S.C. 154(b) by 1231 days.

(21) Appl. No.: 11/728,320

(22) Filed: Mar. 23, 2007

(65) Prior Publication Data
US 2008/0235809 A1 Sep. 25, 2008

(51) Int. Cl.
*G06F 7/04* (2006.01)

(52) U.S. Cl.
USPC .......................................................... 726/27

(58) Field of Classification Search ............ 726/27, 726/28; 713/193; 711/163
See application file for complete search history.

(56) References Cited

U.S. PATENT DOCUMENTS

| 5,343,524 | A | 8/1994 | Mu et al. ........................ 380/4 |
| 5,745,555 | A | 4/1998 | Mark ............................ 379/95 |
| 6,067,622 | A | 5/2000 | Moore ......................... 713/200 |
| 6,449,221 | B1 | 9/2002 | Knight et al. .............. 369/13.35 |
| 6,487,646 | B1 * | 11/2002 | Adams et al. ................ 711/163 |
| 6,915,435 | B1 | 7/2005 | Merriam |
| 7,003,676 | B1 | 2/2006 | Weber et al. ................ 713/194 |
| 7,007,300 | B1 | 2/2006 | Weber et al. .................. 726/21 |
| 7,080,037 | B2 | 7/2006 | Burger et al. ................. 705/50 |
| 7,743,241 | B1 * | 6/2010 | Moore .............................. 713/2 |
| 2002/0007456 | A1 | 1/2002 | Peinado et al. .............. 713/164 |
| 2003/0041248 | A1 | 2/2003 | Weber et al. ................ 713/182 |
| 2003/0200440 | A1 | 10/2003 | England et al. ............. 713/179 |

(Continued)

FOREIGN PATENT DOCUMENTS

| EP | 0 550 282 | 7/1993 |
| EP | 1 391 801 | 2/2004 |

(Continued)

OTHER PUBLICATIONS

"Trusted Computing," http://en.wikipedia.org/wiki/Trusted_computing, published before Feb. 6, 2007, pp. 1-10.

*Primary Examiner* — Brandon Hoffman
*Assistant Examiner* — Samuel Ambaye
(74) *Attorney, Agent, or Firm* — Cesari & Reed, LLP; Kirk A. Cesari

(57) ABSTRACT

A data storage device in which access to user data is restricted. The data storage device includes a data memory having memory locations that store user data. The device also has a program memory. The program memory includes first program code that enables a user to create a first device security ID and thereby restrict access to the stored data. Second program code, also included in the program memory, is capable of receiving a security command and comparing a second device security ID associated with the received security command to a stored security key. If the second device security ID and the stored security key correspond, then authentication with the first device security ID is bypassed and access is provided to the stored data.

20 Claims, 3 Drawing Sheets

U.S. PATENT DOCUMENTS

| | | | |
|---|---|---|---|
| 2003/0200450 A1 | 10/2003 | England et al. | 713/189 |
| 2003/0221113 A1 | 11/2003 | Kupta et al. | 713/189 |
| 2004/0172538 A1 | 9/2004 | Satoh | |
| 2004/0215910 A1 | 10/2004 | Okaue et al. | 711/164 |
| 2004/0236874 A1 | 11/2004 | Largman et al. | 710/8 |
| 2004/0236918 A1* | 11/2004 | Okaue et al. | 711/164 |
| 2004/0243779 A1 | 12/2004 | Okaue et al. | 711/166 |
| 2005/0021968 A1 | 1/2005 | Zimmer et al. | 173/176 |
| 2005/0262361 A1* | 11/2005 | Thibadeau | 713/193 |
| 2008/0061979 A1* | 3/2008 | Hause et al. | 340/572.1 |

FOREIGN PATENT DOCUMENTS

| | | |
|---|---|---|
| EP | 1 391 802 | 2/2004 |
| WO | WO 00/63829 | 10/2000 |
| WO | WO 02/21274 | 3/2002 |
| WO | WO 2005/074434 | 8/2005 |
| WO | WO 2006/115532 | 11/2006 |

* cited by examiner

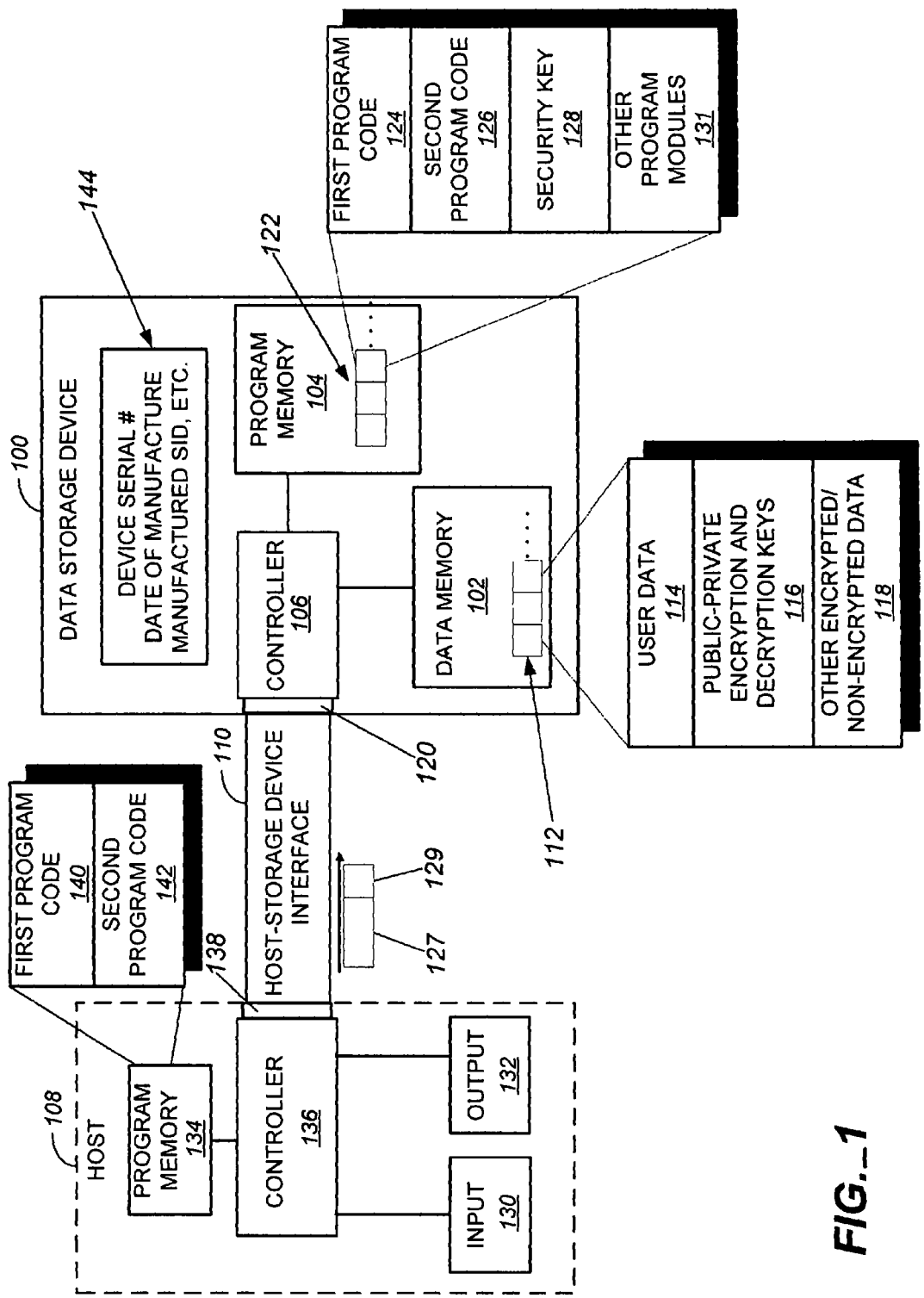
FIG._1

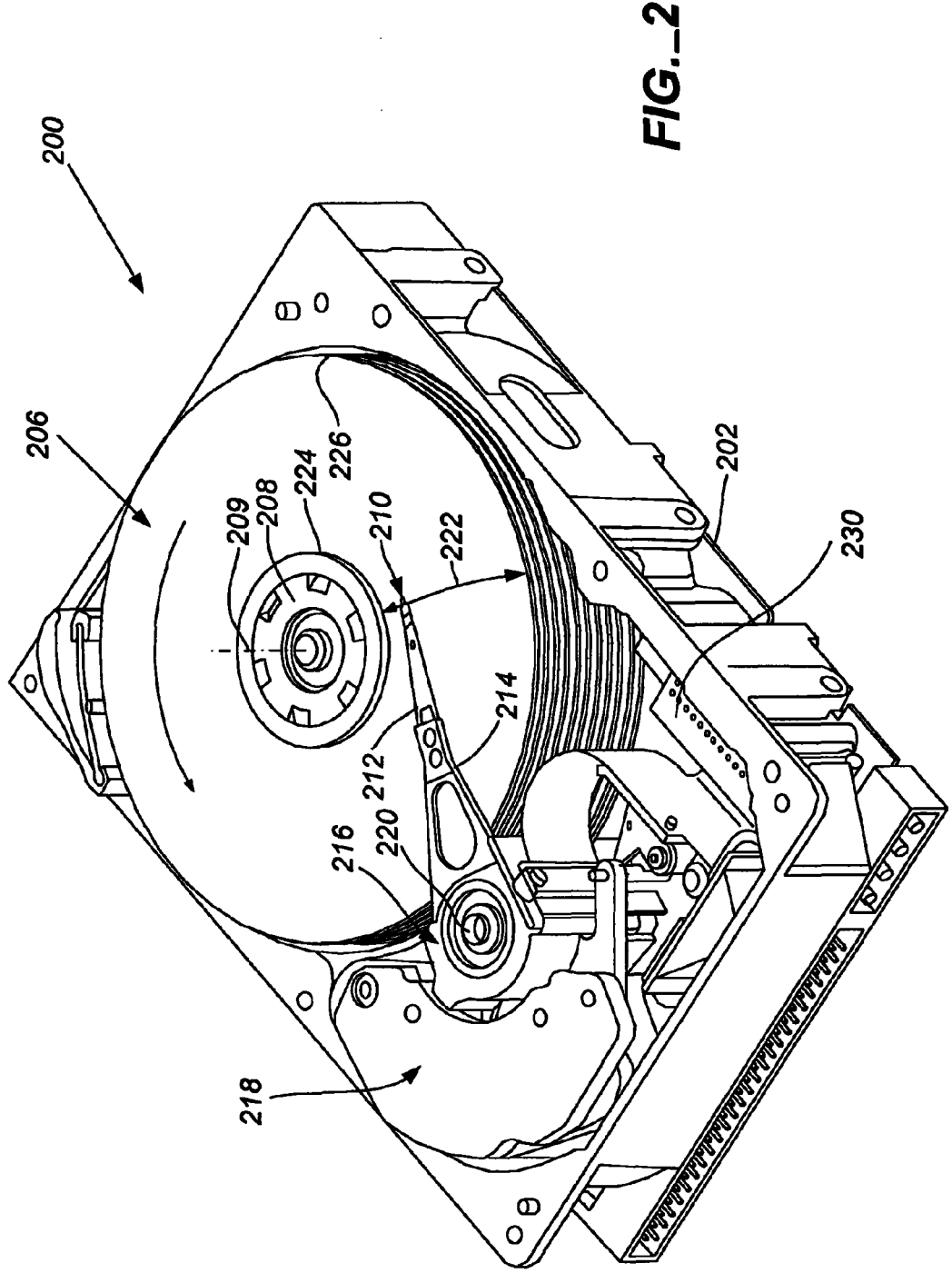
FIG._2

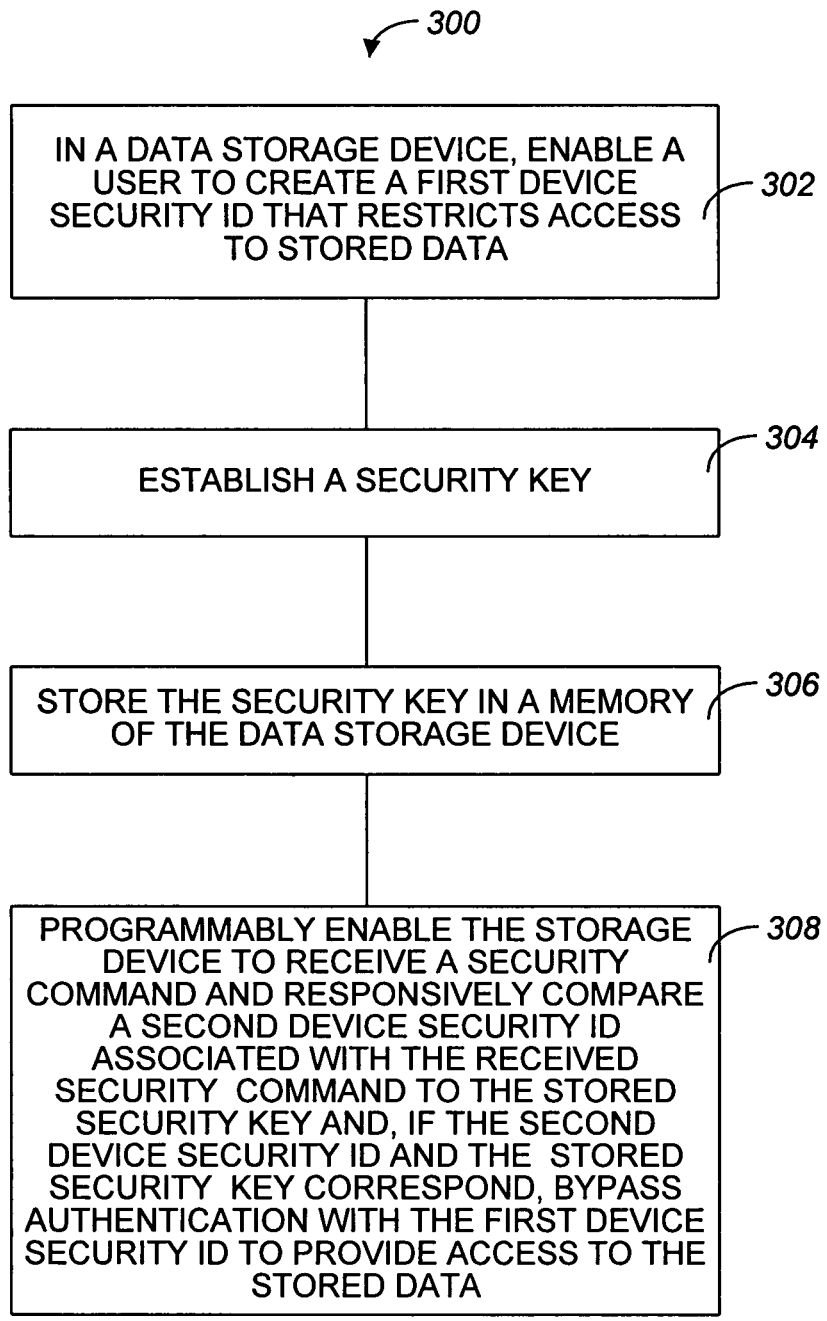
FIG._3

RESTRICTED ERASE AND UNLOCK OF DATA STORAGE DEVICES

FIELD

The present aspects relate generally to data storage devices. More particularly, the present aspects relate to security features in data storage devices.

BACKGROUND

Mass storage devices are one of many components of modern computers. One type of mass storage device is a disc drive. Such drives are used to store vast amounts of information relating to operating systems, applications, and user data. Some of this information is critical to the functioning of the host system in which the disc drive operates. If application software or other critical information is intentionally or unintentionally overwritten, significant losses could occur. Thus, these applications require sophisticated write protection security features. Further, schemes for prevention of unauthorized access of confidential user data are also required.

In many cases, write protection schemes, and schemes for the prevention of unauthorized access of user data, are primarily implemented in the host computer, with the disc drive having little or no control over the operation of these schemes. Lack of control over such schemes within the disc drive is especially problematic in the case of protection of confidential data because, if the disc drive is stolen or removed from the original host computer, the confidential user data is no longer protected. In addition, when a user returns such a drive to the manufacturer when it malfunctions, for example, conducting failure analysis on the drive can be problematic from a security standpoint, complex and costly.

Aspects of the present disclosure provide solutions to these and/or other problems, and offer other advantages over the prior art.

SUMMARY

A data storage device in which access to user data is restricted is provided. The data storage device includes a data memory having memory locations that store user data. The device also has a program memory. The program memory includes first program code that enables a user to create a first device security ID and thereby restrict access to the stored data. Second program code, also included in the program memory, is capable of receiving a security command and comparing a second device security ID associated with the received security command to a stored security key. If the second device security ID and the stored security key correspond, then authentication with the first device security ID is bypassed and access is provided to the stored data. In some data storage device aspects, the stored data is in an encrypted form. In such aspects, if the second device security ID and the stored security key correspond, the second program code provides access to the stored data only in a non-decrypted form. This allows for carrying out operations such as failure analysis of the data storage device without information in the encrypted stored user data being revealed.

These and other features and benefits that characterize aspects of the present disclosure will be apparent upon reading the following detailed description and review of the associated drawings.

BRIEF DESCRIPTION OF THE DRAWINGS

FIG. 1 is a simplified block diagram that illustrates an example data storage device.

FIG. 2 is an isometric view of a disc drive.

FIG. 3 is a simplified flowchart.

DETAILED DESCRIPTION

Referring now to FIG. 1, a simplified block diagram of aspects of a data storage device 100 in which access to user data is restricted is shown. Device 100 includes, as its primary components, a data memory 102, a program memory 104 and a controller 106, which is coupled to data memory 102 and program memory 104. Controller 106 can include one or more processors and circuitry that facilitate communication between host system 108 and data storage device 100 via host-storage device interface 110. Also, controller 106 is capable of receiving commands from host system 108 and responsively executing program code from program memory 104. Host system 108 can include a microprocessor-based data processing system such as a personal computer or other system (local or remote) capable of performing a sequence of logical operations.

Data memory 102 includes a plurality of memory locations 112 that are capable of storing encrypted and/or non-encrypted user data 114, encryption and decryption keys 116 for the encrypted user data, and any other type of encrypted/non-encrypted data 118. Program memory 104 includes, in its memory locations 122, first program code 124, second program code 126, security key 128 and any other program modules 131. In some of the present aspects, security key 128 may be generated at the time of manufacture of the data storage device 100 from manufacturing process data, such as a serial number of device 100 and date of manufacture of device 100, and stored in program memory 104. The manufacturing process data from which security key 128 may be generated can also include a manufactured security ID, which, although also generated at the time of manufacture, may be different from security key 128. The device serial number, date of manufacture of the device and the manufactured security ID, which are collectively denoted by reference numeral 144, are included on a housing of the data storage device 100. In a specific aspect, information 144 may be included on a label that is affixed to a housing of data storage device 100.

In the present aspects, first program code 124 enables a user to create a first device security ID and thereby restrict access to the stored data 114. It should be noted that, the first device security ID is usually encrypted in the device 100 in a manner that does not allow for it to be read from the device. Second program code 126 is configured to receive a security command 127 and responsively compare a second device security ID 129 associated with the received security command to the stored security key 128. If the second device security ID 129 and the stored security key 128 correspond, second program code 126 bypasses authentication with the first device security ID to provide access to the stored data 114.

In some data storage device aspects, the stored data may be in an encrypted form. In such aspects, if the second device security ID 129 and the stored security key 128 correspond, second program code 126 provides access to the stored data 114 only in a non-decrypted form. When access is provided to the stored data 114 only in a non-decrypted form, only encrypted data, which is usually binary data from which no information can be derived, can be read. This feature is especially useful when a user, without disabling the first device security ID, returns the drive 100 to the manufacturer when it malfunctions. Specifically, this allows for carrying out operations such as failure analysis of the data storage device without revealing information in the encrypted stored user data. To further protect the user data, in some aspects, the security command 127 includes a security erase command. In such aspects, if the second device security ID 129 and the stored security key 128 correspond, second program code 126 is configured to execute the security erase command by deleting at least one decryption key 116 associated with the stored encrypted data 114. When decryption key 116, associated with the stored encrypted data 114, is deleted, the data cannot be recovered.

Failure analysis of device 100 may be carried out by a storage device failure analysis system, which can be a suitably configured computer such as host system 108 of FIG. 1. As can be seen in FIG. 1, system 108 includes an input 130, an output 132, a program memory 134, a controller 136 and a communication port 138 that couples to data storage device communication port 120 via host-storage device interface 110. Input 130 can be any suitable input device, such as a keyboard, through which data can be entered and various commands can be entered and activated. Output 132 can be any suitable output device such as a display unit or monitor, which is capable of providing a visual rendering of failure analysis results, for example. Controller 136, which can include one or more processors, is coupled to input 130, output 132, program memory 134 and communication port 138 and controls the operation of system 108.

Program memory 134 includes first program code 140 that is configured to generate the second device security ID 129 based on manufacturing process data (such as 144) related to the data storage device 100 and to send the security command (or device unlock command) 127 with the generated security ID 129 to the data storage device 100 via the communication port 138. Second program code 142, also included in program memory 134, is configured to, upon successful execution of the device unlock command 127, perform a failure analysis test on the data storage device 100 and provide failure analysis results.

As indicated above, manufacturing process data used to generate security key 128 and second device security ID 129 is the same or at least similar. Therefore, the same or similar program code can be used to generate security key 128 and second device security ID 129. As noted above, the manufactured security ID, included in manufacturing process data 144, is not stored in any location separate from data storage device 100 and usually cannot be read from any location other than the device housing or outer cover, or label affixed to the device 100. Therefore, in aspects that require the manufactured security ID to generate the second device security ID 129, unlocking of device 100 can only be carried out by a person who has physical possession of device 100 and can read the manufactured security ID from the device. In one of the present aspects, data storage device 100 is a disc drive, described below in connection with FIG. 2, in which access to user data is restricted in a manner described above in connection with FIG. 1.

FIG. 2 is an isometric view of a disc drive 200 in which the present aspects are useful. Disc drive 200 includes a housing with a base 202 and a top cover (not shown). Disc drive 200 further includes a single disc or a disc pack 206, which is mounted on a spindle motor (not shown) by a disc clamp 208. Disc pack 206 includes a plurality of individual discs, which are mounted for co-rotation about central axis 209. Each disc surface has an associated disc head slider 210 which is mounted to disc drive 200 for communication with the disc surface. In the example shown in FIG. 2, sliders 210 are supported by suspensions 212 which are in turn attached to track accessing arms 214 of an actuator 216. The actuator shown in FIG. 2 is of the type known as a rotary moving coil actuator and includes a voice coil motor (VCM), shown generally at 218. Voice coil motor 218 rotates actuator 216 with its attached heads 210 about a pivot shaft 220 to position heads 210 over a desired data track along an arcuate path 222 between a disc inner diameter 224 and a disc outer diameter 226. Voice coil motor 218 is driven by servo electronics 230 based on signals generated by heads 210 and a host computer (not shown). Different discs or different portions of a disc can be used as program memory and data memory sections that store program code (such as 124 and 128 described in connection with FIG. 1) and encrypted user data (such as 114 of FIG. 1), respectively. Alternatively, in disc drive 200, program code and security keys (such as 128 of FIG. 1) can be stored in a disc drive non-volatile memory, which is separate from disc or discs 206, and only user data can be stored on disc or discs 206. In any event, the establishing of the first device security ID and the unlocking of the drive using a security command with an associated second device security ID is carried out in a manner that is substantially similar to that described in connection with FIG. 1.

Referring now to FIG. 3, a flowchart 300 of an a method of restricting access to user data stored in a data storage device is shown. A first step of the method involves enabling a user to create a first device security ID that restricts access to the stored data. This is illustrated at step 302. At step 304, a security key is established. The security key is then stored in the data storage device. This is illustrated at step 306. At step 308, the storage device is programmably enabled to receive a security command and responsively compare a second device security ID associated with the received security command to the stored security key and, if the second device security ID and the stored security key correspond, bypass authentication with the first device security ID to provide access to the stored data. In some aspects, the stored data may be in an encrypted form. In such aspects, if the second device security ID and the stored security key correspond, access to the stored data in a non-decrypted form is provided.

It is to be understood that even though numerous characteristics and advantages of various aspects of the disclosure have been set forth in the foregoing description, together with details of the structure and function of various aspects of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the data storage device while maintaining substantially the same functionality without departing from the scope and spirit of the present disclosure. In addition, although the preferred aspects described herein are directed to a restricted erase and unlock technique for a disc drive, it will be appreciated by those skilled in the art that the teachings of the present disclosure can be applied to any data storage device, without departing from the scope and spirit of the present disclosure.

What is claimed is:

1. A data storage device comprising:
  a memory configured to store data;
  a controller adapted to:
    decrypt encrypted user data stored in the memory;
    receive a first security code;
    compare the first security code to a first security key;
    perform a first unlock of the data storage device to allow
      a first operation to be performed when the first unlock
      is successful, the first unlock including determining when the first security code matches the first security key, wherein the first operation does not allow decryption of the encrypted user data;

receive a second security code;

compare the second security code to a second security key;

perform a second unlock of the data storage device to allow a second operation to be performed when the second unlock is successful, the second unlock including determining when the second security code matches the second security key, wherein the second operation allows decryption of the encrypted user data;

the data storage device does not allow the first operation to be performed when the data storage device is locked and does not allow the second operation to be performed when the data storage device is locked; and the first unlock and the second unlock can be attempted when the data storage device is locked.

2. The data storage device of claim 1 wherein the first security key is generated from manufacturing process data for the data storage device.

3. The data storage device of claim 2 wherein the manufacturing process data is indicated on the data storage device.

4. The data storage device of claim 1 wherein the memory comprises a disc data storage medium.

5. The data storage device of claim 1 wherein the first operation comprises a failure analysis operation and the second operation comprises a data access operation for the encrypted user data.

6. The data storage device of claim 1 wherein the first operation comprises an erase command and the second operation comprises a data access operation for the encrypted user data.

7. The data storage device of claim 6 wherein the erase command comprises deleting at least one decryption key that allows decryption of the encrypted user data.

8. The data storage device of claim 1 wherein the controller is further adapted to:

receive user data to be stored in the memory;

encrypt the received user data to produce the encrypted user data; and store the encrypted user data in the memory.

9. The data storage device of claim 1 wherein the controller is further adapted to:

bypass the first unlock and perform the second unlock when the second security code matches the second security key; and decrypt the encrypted user data when the second unlock is successful and not allow the encrypted user data to be decrypted when the second unlock is not successful.

10. The data storage device of claim 1 wherein the first security key and the second security key are generated by different methods.

11. A method comprising:

performing, at a data storage device, a first operation including a first unlock operation to allow the data storage device to be responsive to a first set of operations when the first unlock operation is successful;

the first unlock operation unlocking the data storage device to allow a first level of access when a first security code matches a first security key, wherein the first level of access allows a second operation of the first set of operations to be performed but the first set of operations does not allow a host to retrieve user data from the data storage device;

performing, at the data storage device, a third operation including a second unlock operation to allow the data storage device to be responsive to a second set of operations when the second unlock operation is successful;

the second unlock operation unlocking the data storage device to allow a second level of access when a second security code matches a second security key, wherein the second level of access allows a fourth operation to be performed that allows the host to retrieve the user data from the data storage device;

the data storage device does not allow the first level of access when the first security key does not match the first security code and the data storage device does not allow the second level of access when the second security key does not match the second security code; and the second operation and the fourth operation are not unlock operations and are not lock operations.

12. The method of claim 11 further comprising encrypting user data to produce encrypted user data and storing the encrypted user data in the device and the first set of operations does not allow the encrypted user data to be decrypted.

13. The method of claim 12 further comprising:

bypassing the first unlock operation and performing the second unlock operation when the second security code matches the second security key;

decrypting the encrypted data when the second level of access is unlocked; and not allowing the encrypted data to be decrypted when only the first level of access is unlocked.

14. The method of claim 13 wherein the first set of operations further comprises an erase operation to delete at least one decryption key that allows decryption of the encrypted user data.

15. A device comprising:

a controller adapted to:

unlock a data storage device from a locked state to allow a first level of access that allows at least a first operation to be performed when a first security code matches a first security key, wherein the first operation cannot be performed when the data storage device is in a locked state and the first level of access does not allow decryption of encrypted user data; and unlock the data storage device from a locked state to allow a second level of access that allows at least a second operation to be performed when a second security code matches a second security key, wherein the second operation cannot be performed when the data storage device is in a locked state and the second level of access allows decryption of the encrypted user data.

16. The device of claim 15 wherein the controller is further adapted to:

receive user data to be stored in a memory;

encrypt the received user data to produce the encrypted user data; and store the encrypted user data in the memory.

17. The device of claim 15 wherein the controller is further adapted to:

bypass unlocking with the first security key and unlock the second level of access when the second security code matches the second security key; and decrypt the encrypted user data when the second security code matches the second security key.

18. The device of claim 17 wherein the first operation comprises a failure analysis operation and the second operation comprises a data access operation for the encrypted user data.

19. The data storage device of claim 17 wherein the first operation comprises an erase command and the second operation comprises a data access operation for the encrypted user data.

20. The device of claim 15 wherein the first operation and the second operation are not lock operations and are not unlock operations.

* * * * *